(12) United States Patent
Uehara et al.

(10) Patent No.: US 8,025,296 B2
(45) Date of Patent: Sep. 27, 2011

(54) SHAFT SEALING MECHANISM

(75) Inventors: Hidekazu Uehara, Takasago (JP); Tanehiro Shinohara, Takasago (JP); Takashi Nakano, Minato-ku (JP); Shin Nishimoto, Minato-ku (JP); Hirokazu Shirai, Minato-ku (JP); Toshio Asada, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 104 days.

(21) Appl. No.: 11/584,670

(22) Filed: Oct. 23, 2006

(65) Prior Publication Data

US 2007/0102886 A1  May 10, 2007

(30) Foreign Application Priority Data

Nov. 10, 2005  (JP) .................. 2005-326069

(51) Int. Cl.
*F16J 15/447* (2006.01)
(52) U.S. Cl. ...................... 277/412; 277/355
(58) Field of Classification Search .................. 277/355, 277/412, 417, 543
See application file for complete search history.

(56) References Cited

U.S. PATENT DOCUMENTS

| | | | | |
|---|---|---|---|---|
| 5,042,823 A * | 8/1991 | Mackay et al. | ................ | 277/355 |
| 5,135,237 A | 8/1992 | Flower | | |
| 5,941,685 A * | 8/1999 | Bagepalli et al. | .......... | 415/173.3 |
| 6,196,550 B1 * | 3/2001 | Arora et al. | .................... | 277/355 |
| 6,267,381 B1 | 7/2001 | Wright | | |
| 6,736,597 B2 * | 5/2004 | Uehara et al. | .............. | 415/174.2 |
| 6,874,788 B2 * | 4/2005 | Kono | ............................. | 277/355 |
| 6,976,680 B2 * | 12/2005 | Uehara et al. | .................. | 277/355 |
| 7,066,468 B2 * | 6/2006 | Uehara et al. | .................. | 277/355 |
| 7,159,872 B2 * | 1/2007 | Nicholson et al. | ............. | 277/355 |
| 7,201,378 B2 * | 4/2007 | Kono | ............................. | 277/355 |
| 7,226,053 B2 * | 6/2007 | Nakano et al. | ................. | 277/355 |
| 7,334,328 B2 * | 2/2008 | Uehara et al. | ................. | 29/888.3 |
| 2005/0012275 A1 * | 1/2005 | Nakano et al. | ................. | 277/411 |
| 2006/0033285 A1 * | 2/2006 | Nishimoto et al. | ........... | 277/355 |
| 2007/0018408 A1 * | 1/2007 | Kono | ............................. | 277/355 |

FOREIGN PATENT DOCUMENTS

| | | |
|---|---|---|
| EP | 1 013 975 A1 | 6/2000 |
| EP | 1 302 708 A2 | 4/2003 |
| EP | 1 482 220 A1 | 12/2004 |
| GB | 2 286 434 | 8/1995 |
| JP | 2003-113945 | 4/2003 |
| JP | 2003-294153 | 10/2003 |
| JP | 2004-353796 | 12/2004 |
| JP | 2005-9684 | 1/2005 |
| WO | 2005/103536 | 11/2005 |

OTHER PUBLICATIONS

"The Development of High Performance Leaf Seals", Proceedings of Asume Turbo Expo 2002 Jun. 3-6, 2002, Amsterdam, Netherlands, GT-2002-30243.

\* cited by examiner

*Primary Examiner* — Alison Pickard
(74) *Attorney, Agent, or Firm* — Wenderoth, Lind & Ponack, L.L.P.

(57) ABSTRACT

In a shaft sealing mechanism which prevents fluid from flowing in an axial direction of a rotor through an annular gap between the rotor and a stator, there are provided a high pressure side plate positioned on a high pressure side region of a plurality of sheets, and a low pressure side plate positioned on a low pressure side region of the plurality of sheets, and construction is such that in a state in which the plurality of sheets is fixed on a stator side, and when under gas pressure, the sheets make contact with each other.

9 Claims, 6 Drawing Sheets

SHAFT SEALING MECHANISM

BACKGROUND OF THE INVENTION

1. Field of the Invention

The present invention relates to a shaft sealing mechanism that is suitable for use for a shaft of large fluid machinery, such as a gas turbine, a steam turbine, a compressor, a pump, or the like.

2. Description of Related Art

As a shaft sealing mechanism, there is known a type disclosed in Japanese Unexamined Patent Application, Publication No. 2003-113945. The shaft sealing mechanism disclosed in this Patent Document is provided with a leaf seal which is arranged around a shaft of a gas turbine, a steam turbine, or the like, that reduces an amount of gas that leaks from a high-pressure side to a low-pressure side.

However, in the above Patent Document, one end of each of sheets constituting the leaf seal is constructed such that it becomes a free edge (so that the sheets are not restricted by each other) when assembly of the leaf seal is completed and when it is under gas pressure. Therefore, in a case where eccentricity results from a shaft of a gas turbine, a steam turbine, or the like, moving by a degree of float due to dynamic pressure of a sliding bearing, or in a case where eccentricity occurs in a parent machine due to thermal deformation of a turbine housing, flutter behavior is caused at one end of the sheet. Therefore, there is concern that the sheets may fail due to fatigue.

BRIEF SUMMARY OF THE INVENTION

The present invention takes into consideration the above problem, with an object of providing a shaft sealing mechanism in which, even in a case where eccentricity occurs in a parent machine, flutter behavior of sheets can be reliably prevented, the sheets can be prevented from failing due to fatigue, and also a long life of the shaft sealing mechanism can be envisaged, and reliability of the shaft sealing mechanism can be improved.

The present invention adopts the following in order to solve the above problem.

A shaft sealing mechanism according to the present invention is a shaft sealing mechanism in which there is provided an annular group of sheets, wherein a plurality of sheets is arranged in an annular gap between a rotor and a stator, and these annular sheets divide the annular gap between the rotor and the stator into a high pressure side region and a low pressure side region by outer peripheral side proximal end parts of the sheets being fixed on a stator side, and by inner peripheral side ends of the sheets being left unattached on a surface of the rotor, so that fluid can be prevented from flowing in an axial direction of the rotor through the annular gap between the rotor and the stator, wherein there are provided a high pressure side plate positioned on the high pressure side region of the plurality of sheets, and a low pressure side plate positioned on the low pressure side region of the plurality of sheets, and construction is such that in a state in which the plurality of sheets is fixed on the stator side, and when under gas pressure, the sheets make contact with each other.

According to such a shaft sealing mechanism, since the sheets are maintained to always be in contact with each other, even if a large amount of eccentricity occurs in a parent machine, flutter behavior of the sheets can be reliably prevented, the sheets can be prevented from failing due to fatigue, and also a long life of the shaft sealing mechanism can be envisaged, and reliability of the shaft sealing mechanism can be improved.

Fluid machinery according to the present invention is furnished with the above-described shaft sealing mechanism.

According to such fluid machinery, since it is provided with a shaft sealing mechanism in which long life and improvement of reliability can be envisaged, a period for maintenance of the shaft sealing mechanism can be extended, maintenance cost can be reduced, and reliability of the fluid machinery can be improved.

According to the present invention, there are effects in which, even in a case where eccentricity occurs in the parent machine, flutter behavior of the sheets can be reliably prevented, the sheets can be prevented from failing due to fatigue, and also a long life of the shaft sealing mechanism can be envisaged, and reliability of the shaft sealing mechanism can be improved.

BRIEF DESCRIPTION OF THE DRAWINGS

FIG. 5A and FIG. 5B are diagrams showing sheets after a sheet welding process, and FIG. 5C is a diagram showing the sheets after a bending process.

DETAILED DESCRIPTION OF THE PREFERRED EMBODIMENTS

Hereunder is a description of an embodiment of a shaft sealing mechanism according to the present invention with reference to FIG. 1 to FIG. 6.

Figure 1:
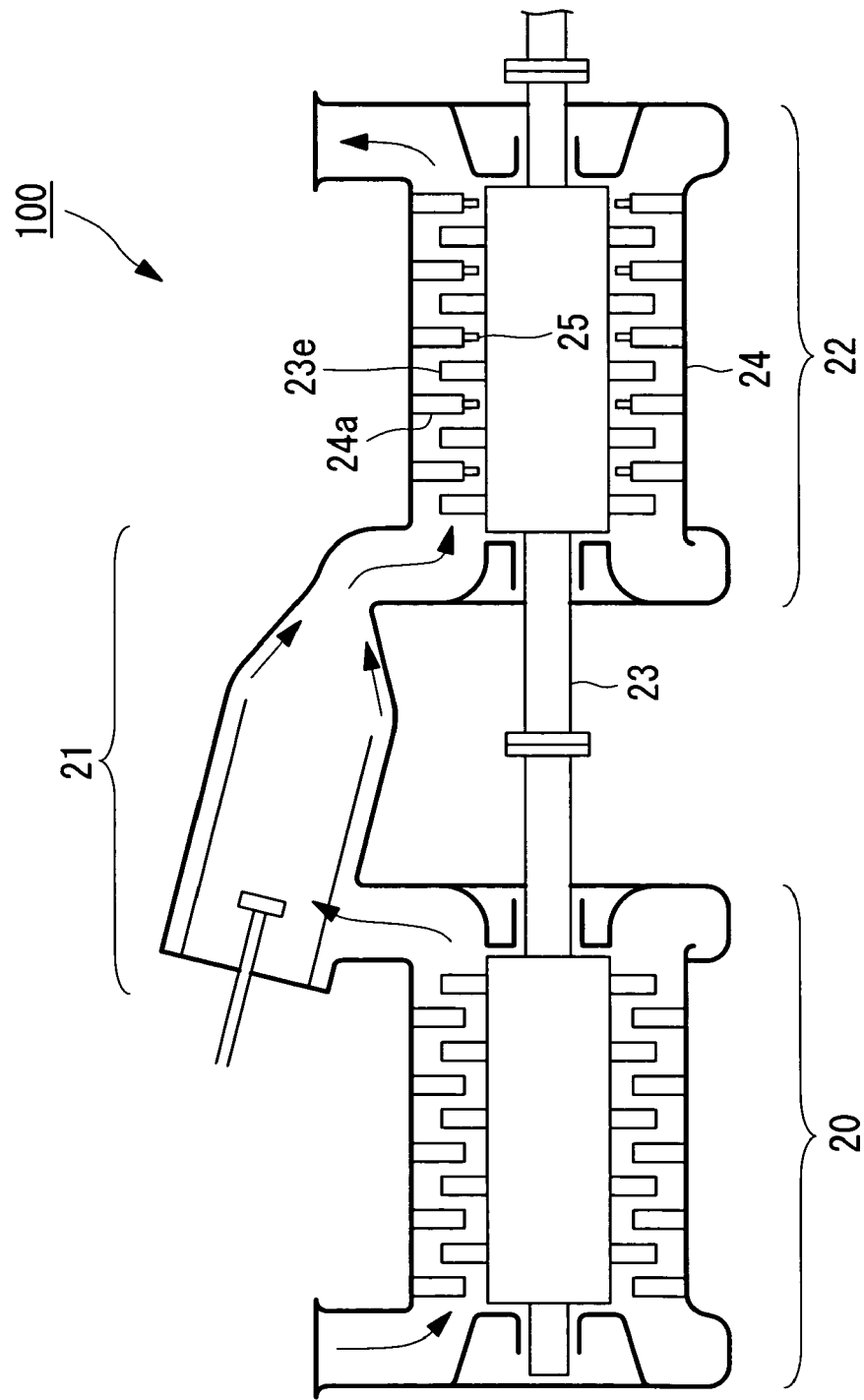
FIG. 1 is a schematic block diagram of a gas turbine furnished with a shaft sealing mechanism according to the present invention.

FIG. 1 is a schematic block diagram of a fluid mechanism (referred to hereunder as "gas turbine") 100 containing a shaft sealing mechanism according to the present invention. In FIG. 1, reference symbol 20 denotes a compressor, reference symbol 21 denotes a combustor, and reference symbol 22 denotes a turbine.

First, an outline structure of the gas turbine 100 is shown in FIG. 1. The compressor 20 takes a large amount of air inside itself and compresses it. Normally, in a gas turbine, part of a driving force obtained from a shaft (rotor) 23, which is described later, is used as a driving force of the compressor. The combustor 21 mixes fuel into compressed air and burns it. A combustion gas generated by the combustor 21 is introduced inside the turbine 22, where it expands and blows against moving blades 23e installed on the shaft 23, whereby thermal energy of the combustion gas is converted into mechanical rotational energy to generate a driving force.

The turbine 22 is provided with a plurality of stationary blades 24a arranged on a stator 24 side in addition to the moving blades 23e arranged on the shaft 23. The moving blades 23e and stationary blades 24a are arranged alternately in an axial direction of the shaft 23. On receiving pressure of the combustion gas flowing in the axial direction of the shaft 23, the moving blades 23e rotate the shaft 23, and rotational energy applied to the shaft 23 is extracted from a shaft end to be used. Leaf seals 25 are provided between each of the stationary blades 24a and the shaft 23 as a shaft sealing mechanism for reducing an amount of the combustion gas that leaks from a high pressure side to a low pressure side.

Figure 2:
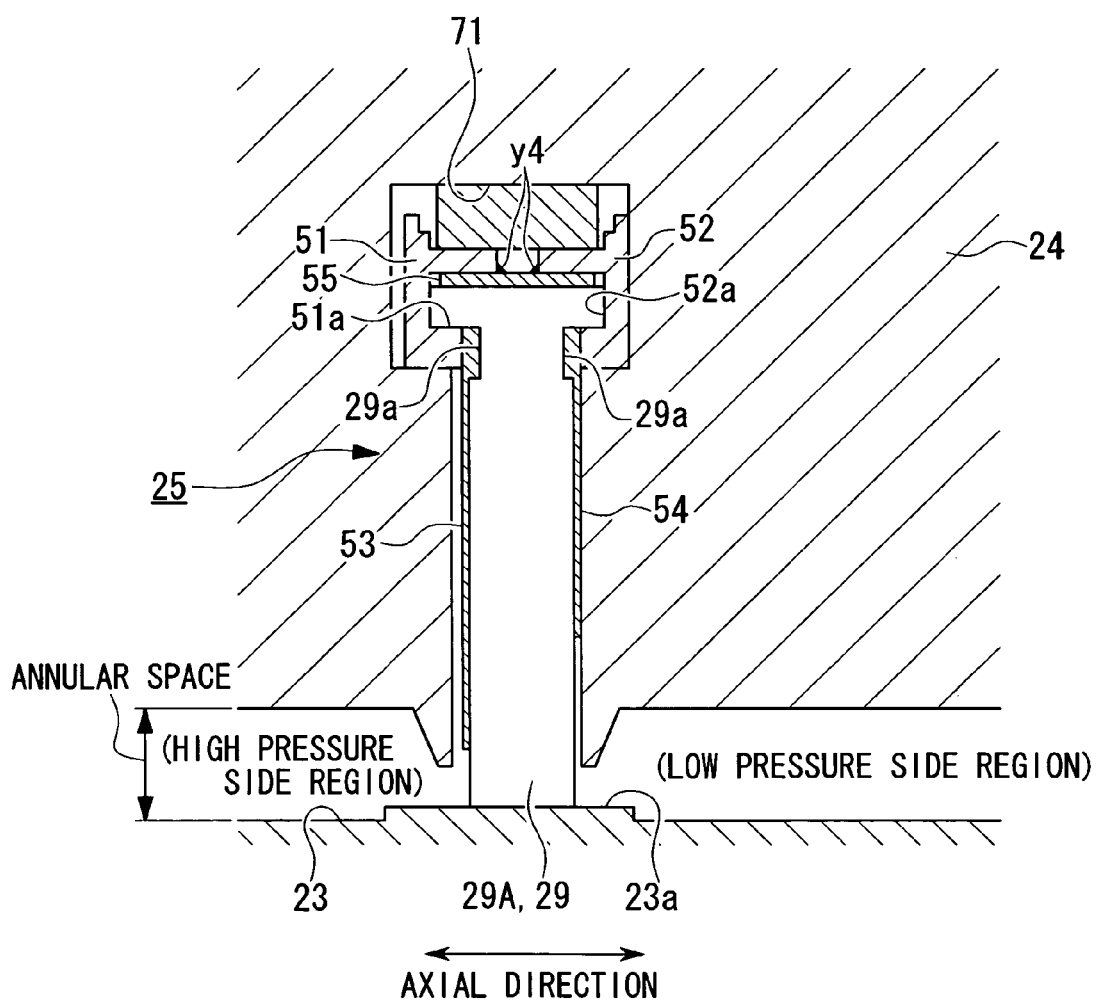
FIG. 2 is a diagram showing a structure in which a leaf seal of the sealing mechanism is built into a stator, being a cross sectional view, viewed on a plane containing an axis of a shaft.

FIG. 2 shows an enlarged sectional view of leaf seal 25. In this drawing, the leaf seal 25 is viewed in a cross section containing an axis of the shaft 23. In the following description, a basic structure of the leaf seal 25 is described first, and description of its characteristics continues afterwards.

First is a description of the basic structure of the leaf seal 25. As shown in FIG. 2, the leaf seal 25 is provided with an annular group of sheets 29A, in which a large number of sheets 29 are arranged in a stack in an annular space between the shaft 23 and the stator 24 with a widthwise direction of each sheet arranged in the same direction as the axis of the shaft 23, and with a minute gap between each of the sheets in a circumferential direction of the shaft 23.

The sheets 29 are fixed to the stator 24 at their outer peripheral side proximal end parts, and are arranged such that their inner peripheral ends are tilted at an acute angle in the circumferential direction towards circumferential surface 23a of the shaft 23. By so doing, an annular group of sheets 29A comprising the sheets 29 divides the annular space between the shaft 23 and the stator 24 into a high pressure side region and a low pressure side region.

Hereunder is a description of the characteristics of the leaf seal 25 having the above-described basic structure, with reference to FIG. 2.

As shown in this figure, the leaf seal 25 of the present embodiment is approximately in a T shape with a plate width at an outer peripheral side proximal end part being larger than that at an inner peripheral side end, and comprises: a plurality of stacked sheets 29; a pair of leaf seal retainers 51 and 52 (sheet retaining rings), which retain the sheets 29 in a ring; a high pressure side annular plate 53, which is interposed between edges of each of the sheets 29 on one side facing the high pressure side region and one leaf seal retainer 51, making contact with edges on that side; a low pressure side annular plate 54, which is interposed between edges on another side facing the low pressure side region and the other sheet retainer 52, making contact with another side edge; and a spacer 55, which is interposed between the leaf seal retainers 51 and 52, reducing backlash of each of the sheets 29.

Each of the sheets 29 is an approximately T shaped flexible thin steel plate, and has notches 29a on edges of its two sides. The sheets 29 are fixed and welded to each other on an outer peripheral proximal end side (welding location is mentioned in the description of FIG. 4 later), thereby forming a group of sheets having flexibility as a whole.

Figure 6:
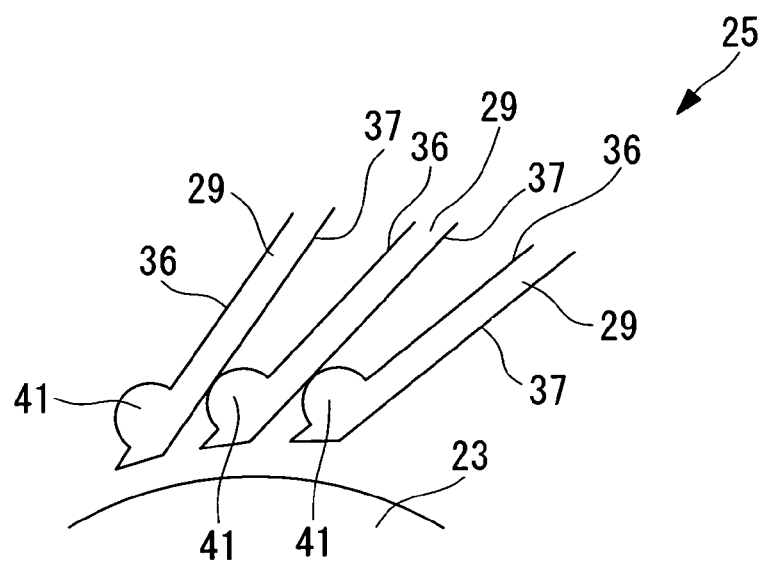
FIG. 6 is a diagram showing an embodiment of the shaft sealing mechanism according to the present invention, and a sectional view of sheet ends.

Furthermore, as shown in FIG. 6, one hemispherical bump 41 is provided on an upper surface 36 of each of the sheets 29. A height of each of the bumps 41 is arranged such that when the leaf seal 25 is assembled, one point (part) of a surface of the bump 41 and one point (part) of a lower surface 37 of the sheet 29 positioned adjacent thereto make contact with each other. The sheets 29 are made by performing a press operation, etching, or the like.

As shown in FIG. 2, the high pressure side plate (high pressure side sideplate) 53 is an annular sheet, and has an outer peripheral part which is a step thicker than an inner peripheral part such that when it is viewed in cross section, its profile is stepped on one side. Similarly, the low pressure side plate (low pressure side sideplate) 54 is an annular sheet, and has an outer peripheral part which is a step thicker than an inner peripheral part such that when it is viewed in cross section, its profile is stepped on one side. After the high pressure side plate 53 and the low pressure side plate 54 are laid on two side surfaces of each of the sheets 29 so that they fit in the notches 29a at the stepped parts, they are then interposed between the leaf seal retainers 51 and 52 to be secured.

The leaf seal retainers 51 and 52 are flexible metal components with an approximately "C" shape when viewed in a cross section containing the axial direction of the shaft 23, and a broad part of each of the sheets 29 and the spacer 55 are fitted into concave sections 51a and 52a formed when they are laid together.

Figure 3:
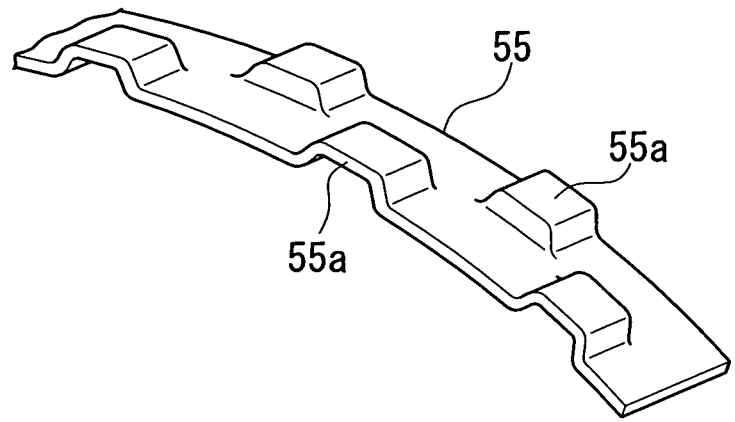
FIG. 3 is a perspective view showing a spacer provided in the leaf seal.

As shown in FIG. 3, the spacer 55 is a plate spring in which a plurality of convex parts 55a is formed for generating an urging force by being elastically deformed under pressure, and as shown in FIG. 2, it uses the urging force to hold the annular group of sheets 29A down from the outer peripheral side against the concave sections 51a and 52a such that the annular group of sheets 29A does not generate backlash in the concave sections 51a and 52a. By welding an upper side of the spacer 55 and the leaf seal retainers 51 and 52 at welding locations y4, it is possible to fix relative positions between these members.

Hereunder is a description of a manufacturing method of leaf seal 25 having the structure described above, with reference to FIG. 4 and FIG. 5. The leaf seal 25 is manufactured via a sheet welding step, a bending step, and a ring mounting step.

Figure 4:
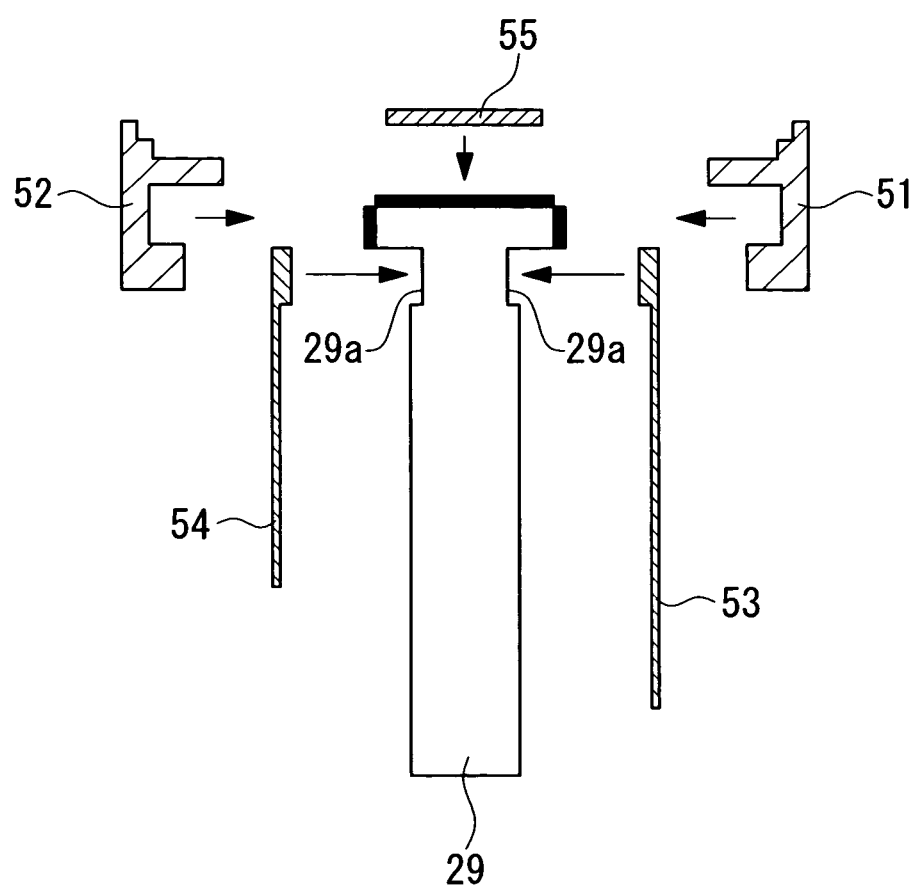
FIG. 4 is a diagram showing a continuation of a manufacturing method of the leaf seal, shown as an assembly diagram to explain a ring mounting process.
Figure 5B:
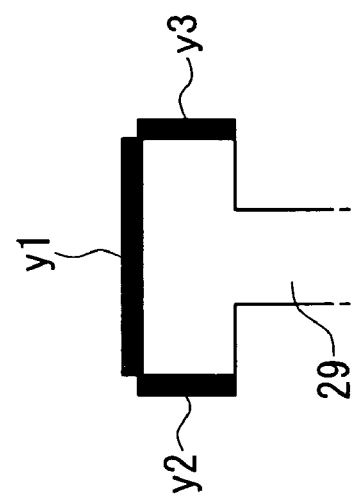
FIG. 5A, FIG. 5B and FIG. 5C are diagrams showing a method of manufacturing the leaf seal.
Figure 5A:
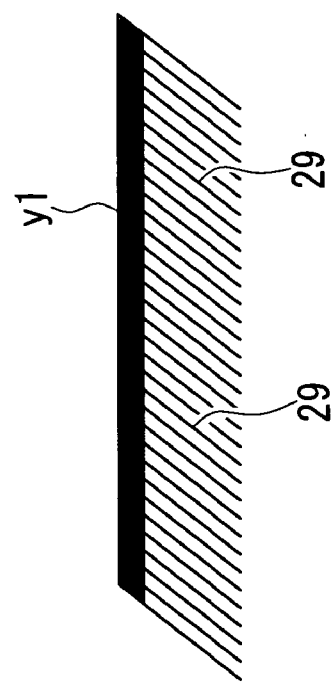

First, in the sheet welding step, as shown in FIG. 5A, after sheets 29, which are steel plates punched in a T shape, are stacked one on top of another diagonally in a circumferential direction such that there are gaps between the sheets, and one point (one part) of a surface of bump 41 and one point (one part) of lower surface 37 of sheet 29 positioned adjacent thereto make contact, their outer peripheral proximal end sides are welded. That is, as shown in FIG. 4 and FIG. 5B, all of the sheets 29 are welded to each other at an outer peripheral end and two side ends on an outer peripheral proximal end side (reference symbols y1 to y3).

Figure 5C:
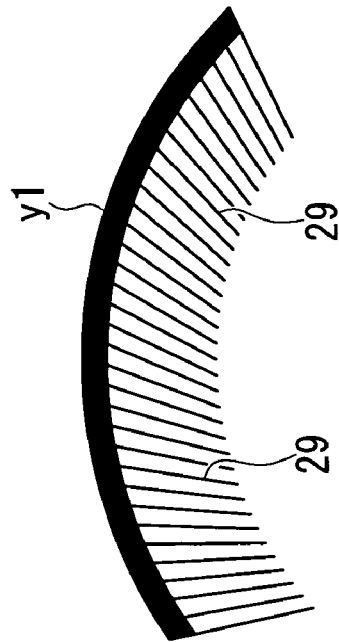

In a subsequent bending step, all of the sheets 29 welded to each other, and both of leaf seal retainers 51 and 52, are bent roughly before a next, shaft sealing mechanism insertion step. FIG. 5C shows all of the sheets 29 after the bending step.

In a subsequent ring mounting step, as shown in FIG. 4, an outer peripheral proximal end side of the welded sheets 29, high pressure side plate 53, low pressure side plate 54, and spacer 55, are inserted between the leaf seal retainers 51 and 52, and afterwards, the leaf seal retainers 51 and 52 are secured.

That is, between edges of each of the sheets 29 on one side facing the high pressure side region, and the leaf seal retainer 51, the annular high pressure side plate 53, which makes contact with the edges on that side, is interposed and secured. Similarly, between edges of each of the sheets 29 on the other side facing the low pressure side region, and the leaf seal retainer 52, the annular low pressure side plate 54, which makes contact with the edges of the other side, is interposed and secured. Furthermore, between the outer peripheral proximal end sides of the sheets 29 and the leaf seal retainers 51 and 52, the spacer 55, which controls relative movement of the sheets 29 with respect to each other, is interposed and secured.

After these parts are interposed in this manner, the leaf seal retainers 51 and 52 are fixed and welded to the spacer 55 at each of the welding locations y4 (refer to FIG. 2). By so doing, the leaf seal retainers 51 and 52 are secured.

By using the leaf seal 25 according to the present invention, it is possible for one point (part) of the surface of the bump 41 and one point (part) of the lower surface 37 of the sheet 29 positioned adjacent thereto, to always be in contact with each other via the bumps 41 provided on the upper surfaces 36 of the sheets 29 when assembly of the leaf seal 25 is completed and when it is under gas pressure. Accordingly, even if a large amount of eccentricity occurs in a parent machine, flutter behavior of the sheets 29 can be reliably prevented, the sheets 29 can be prevented from failing due to fatigue, and also a long life of the leaf seal 25 can be envisaged, and reliability of the leaf seal 25 sealing mechanism can be improved.

Furthermore, using the structure and manufacturing method of the leaf seals 25 according to the present embodiment, even for places where the leaf seals 25 are positioned, and their diameters, vary slightly, a separate, special tool does not have to be prepared as conventionally, and therefore it is possible to reduce a manufacturing cost of the leaf seals 25. Moreover, since thicknesses of the leaf seal retainers 51 and 52 are made thin so that they are flexible, outside dimensions of the leaf seal retainers 51 and 52 can be made smaller, so that it is also possible to contribute to a more compact leaf seal 25 overall.

When assembled shaft sealing members (leaf seals 25) are installed into the stator 24, they may be inserted while being bent along a curvature of concave grooves 71 provided on an inner peripheral face side of the stator 24. By so doing, a curvature of the leaf seals 25 can be altered freely according to their installation locations, so that a separate, special tool does not have to be prepared. This enables a manufacturing cost of leaf seals 25 to be reduced.

Furthermore, the leaf seal manufacturing method of the present embodiment uses a method in which the high pressure side plate 53 is interposed between the edges of each of the sheets 29 on one side and the sheet retaining ring 51 in the ring mounting step, and secured. According to this method, since the high pressure side plate 53 can be mounted easily, it is possible to further reduce the manufacturing cost.

Moreover, the leaf seal manufacturing method of the present embodiment uses a method in which the low pressure side plate 54 is interposed between the edges of each of the sheets 29 on the other side and the sheet retaining ring 52 in the ring mounting step, and secured. According to this method, since the low pressure side plate 54 can be mounted easily, it is possible to further reduce the manufacturing cost.

According to a gas turbine containing such leaf seals 25, since a sealing function can be maintained even with a high differential pressure, loss in driving force due to leakage of gas is reduced.

Another embodiment of a leaf seal according to the present invention will be described with reference to FIG. 7 and FIG. 8.

Figure 7:
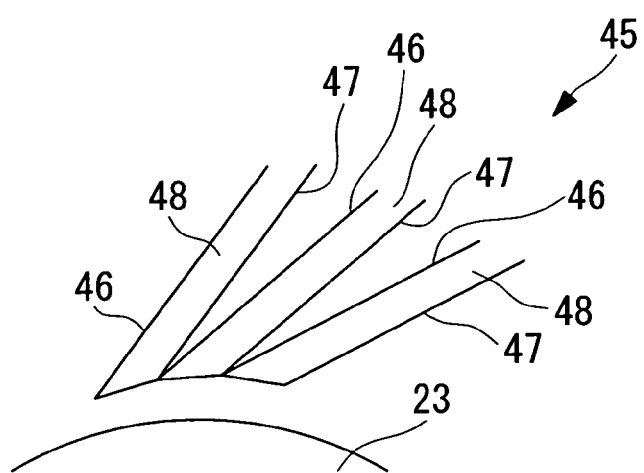
FIG. 7 is a diagram showing another embodiment of the shaft sealing mechanism according to the present invention, and a sectional view of sheet ends.

A point of difference of leaf seals 45 of this present embodiment from the aforementioned embodiment is that they are constructed such that, instead of the bumps 41, tips of upper surfaces 46 of sheets 48 and tips of lower surfaces 47 of sheets 48 positioned adjacent thereto make contact when assembly is completed, as shown in FIG. 7. Other elements are the same as those in the aforementioned embodiment, and descriptions of these elements are omitted here.

The same symbols are used for the same elements as in the aforementioned embodiment.

It is possible to calculate a number of sheets 48, wherein the tips of the upper surfaces 46 of the sheets 48 make contact with the tips of the lower surfaces 47 of the sheets 48 when assembly is completed, and dimensions of each sheet 48 (that is thickness $t_0$ of a proximal end part of the sheet 48), geometrically, as shown in FIG. 8.

First, $R_1$ and $R_2$ are set to an inner diameter and outer diameter of a location in which the leaf seal 45 is used, respectively.

Figure 8A:
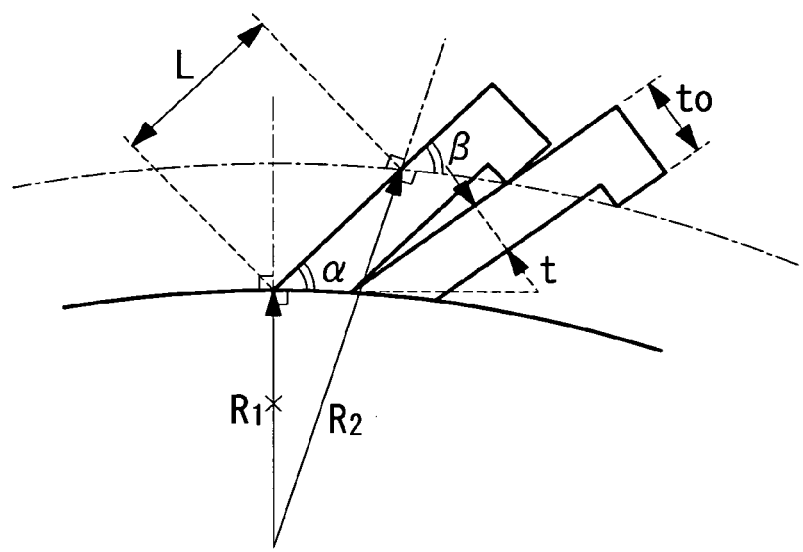
FIG. 8 is a diagram to explain a method for calculating a number of sheets shown in FIG. 7, and dimensions of each sheet.

Next, when an effective length L of the sheet 48 is specified, $\alpha$ and $\beta$ are determined using the following equation (1) and equation (2) (refer to FIG. 8(A)).

$$(R_2)^2 = (R_1)^2 + L^2 - 2 \times R_1 \times L \times \cos(\alpha + 90°) \quad \text{Equation (1)}$$

$$(R_1)^2 = (R_2)^2 + L^2 - 2 \times R_2 \times L \times \cos(90° - \beta) \quad \text{Equation (2)}$$

Figure 8B:
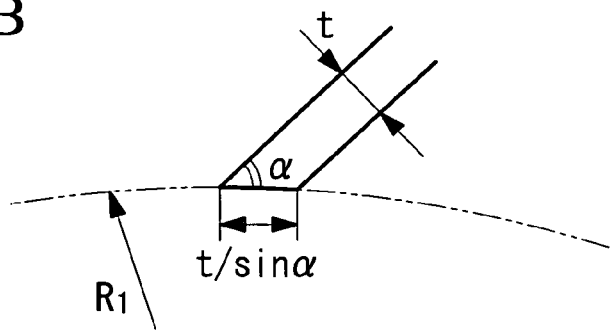

A thickness (thickness after etch processing) t of a leaf of the sheets 48 is specified, and a number n of the sheets 48 is calculated (refer to FIG. 8(B)).

$$n = (2 \times \pi \times R_1)/(t/\sin \alpha) \quad \text{Equation (3)}$$

Figure 8C:
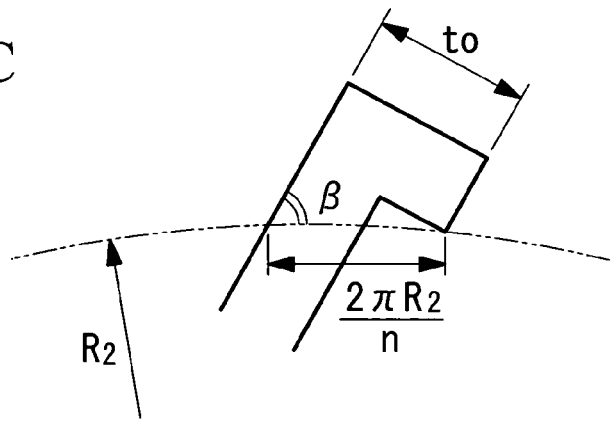

Then, thickness (thickness before etch processing) $t_0$ of the proximal end part of the sheet 48 is calculated using the following equation (4) (refer to FIG. 8(C)).

$$t_0 = ((2 \times \pi \times R_2)/n) \times \sin \beta \quad \text{Equation (4)}$$

Figure 8D:
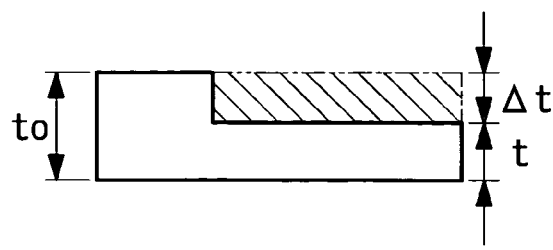

Lastly, an amount $\Delta t$ by which the thickness of the sheet 48 is reduced by etching is calculated using the following equation (5) (refer to FIG. 8(D)).

$$\Delta t = t_0 - t \quad \text{Equation (5)}$$

Using the leaf seal 45 according to the present embodiment, when assembly of the leaf seal 45 is completed, and when it is under gas pressure, the tips of the upper surfaces 46 of the sheets 48 and the tips of the lower surfaces 47 of the sheets 48 are maintained to always be in contact with each other. Accordingly, even if a large amount of eccentricity occurs in a parent machine, flutter behavior of the sheets 48 can be reliably prevented, the sheets 48 can be prevented from failing due to fatigue, and also a long life of the leaf seal 45 can be envisaged, and reliability of a leaf seal sealing mechanism including leaf seals 45 can be improved.

Furthermore, other working effects are the same as in the aforementioned embodiment, and hence descriptions are omitted here.

The present invention is not limited to the above-described embodiments, and any form may be used as long as it can prevent each sheet from moving (oscillating or vibrating) when assembly of a leaf seal is completed, and when it is under gas pressure.

Accordingly, the bumps 41 that are described using FIG. 6 may be provided on the lower surfaces 37 of the sheets 28, or they may be provided on both the upper surfaces 36 and the lower surfaces 37 of the sheets.

Moreover, the above embodiments are described using hemispherical bumps 41 with a circular plan view as one specific example. However, the present invention is not limited to this, and they may be conical with a circular plan view, or may be polygonal pyramids with a polygonal plan view, for example.

Furthermore, the above embodiments are described using as an example a case in which large fluid machinery, in which the present invention is used, is a turbine of a gas turbine. However, the present invention is also applicable to rotational shafts of other large fluid machinery, such as steam turbines, compressors, waterwheels, refrigerators, pumps, aviation gas turbine engines, and the like.

Effective length L of the sheets, and leaf thickness (thickness after etch processing) t are each designed such that they are balanced by dynamic pressure when under gas pressure (when operating).

What is claimed is:

1. A shaft sealing mechanism comprising:
   a leaf seal in an annular gap between a rotor and a stator, said leaf seal including stacked sheets separated from one another by a minute gap in a circumferential direction of the rotor, said sheets dividing the annular gap into a high pressure side region and a low pressure side region by virtue of outer peripheral side end parts of said sheets being fixed on a stator side of said annular gap and inner peripheral side end parts of said sheets being unattached at a surface of the rotor, whereby fluid can be prevented from flowing in an axial direction of the rotor through the annular gap; and
   a high pressure side plate on the high pressure side region of said sheets, and a low pressure side plate on the low pressure side region of said sheets, with an inner peripheral side end of said high pressure side plate being positioned nearer the rotor than is an inner peripheral side end of said low pressure side plate, and with a space being provided between said inner peripheral side end of said low pressure side plate and a surface of the rotor, said space communicating with the annular gap,
   such that, in a state in which assembly of the leaf seal is complete and said sheets are under gas pressure, an inner peripheral side end portion of each of said sheets always makes contact with an inner peripheral side end portion of an immediately adjacent one of said sheets,
   wherein said sheets are arranged so as to satisfy $(R_2)^2=(R_1)^2+L^2-2\times R_1\times L\times \cos(\alpha+90°)$, $(R_1)^2=(R_2)^2+L^2-2\times R_2\times L\times \cos(90°-\beta)$, $n=(2\times\pi\times R_1)/(t/\sin \alpha)$, $t_0=((2\times\pi\times R_2)/n)\times\sin \beta$, and $\Delta t=t_0-t$, and wherein
   $R_1$ is an inner diameter of the annular gap,
   $R_2$ is an outer diameter of the annular gap,
   L is an effective length of one of said sheets,
   $\alpha$ is an angle between a radially outward surface of an inner peripheral side end portion of said one of said sheets and a contact surface of an inner periphery of the annular gap with said one of said sheets,
   $\beta$ is an angle between a radially outward surface of an outer peripheral side fixed portion of said one of said sheets and a contact surface of an outer periphery of the annular gap with said one of said sheets,
   n is the number of said sheets,
   t is a thickness of a leaf of said one of said sheets,
   $t_0$ is a thickness of a proximal end part of said one of said sheets, and
   $\Delta t$ is an amount by which a thickness of said one of said sheets is reduced by etching.

2. Fluid machinery including a shaft sealing mechanism according to claim 1.

3. A shaft sealing mechanism comprising:
   a leaf seal in an annular gap between a rotor and a stator, said leaf seal including stacked sheets separated from one another by a minute gap in a circumferential direction of the rotor, said sheets dividing the annular gap into a high pressure side region and a low pressure side region by virtue of outer peripheral side end parts of said sheets being fixed on a stator side of said annular gap and inner peripheral side end parts of said sheets being unattached at a surface of the rotor, whereby fluid can be prevented from flowing in an axial direction of the rotor through the annular gap; and
   a high pressure side plate on the high pressure side region of said sheets, and a low pressure side plate on the low pressure side region of said sheets, with an inner peripheral side end of said high pressure side plate being positioned nearer the rotor than is an inner peripheral side end of said low pressure side plate, and with a space being provided between said inner peripheral side end of said low pressure side plate and a surface of the rotor, said space communicating with the annular gap,
   such that, in a state in which assembly of the leaf seal is complete and said sheets are under gas pressure, an inner peripheral side end portion of a surface of each of said sheets always makes contact with an inner peripheral side end portion of an opposite surface of an immediately adjacent one of said sheets,
   wherein said sheets are arranged so as to satisfy $(R_2)^2=(R_1)^2+L^2-2\times R_1\times L\times \cos(\alpha+90°)$, $(R_1)^2=(R_2)^2+L^2-2\times R_2\times L\times \cos(90°-\beta)$, $n=(2\times\pi\times R_1)/(t/\sin \alpha)$, $t_0=((2\times\pi\times R_2)/n)\times\sin \beta$, and $\Delta t=t_0-t$, and wherein
   $R_1$ is an inner diameter of the annular gap,
   $R_2$ is an outer diameter of the annular gap,
   L is an effective length of one of said sheets,
   $\alpha$ is an angle between a radially outward surface of an inner peripheral side end portion of said one of said sheets and a contact surface of an inner periphery of the annular gap with said one of said sheets,
   $\beta$ is an angle between a radially outward surface of an outer peripheral side fixed portion of said one of said sheets and a contact surface of an outer periphery of the annular gap with said one of said sheets,
   n is the number of said sheets,
   t is a thickness of a leaf of said one of said sheets,
   $t_0$ is a thickness of a proximal end part of said one of said sheets, and
   $\Delta t$ is an amount by which a thickness of said one of said sheets is reduced by etching.

4. Fluid machinery including a shaft sealing mechanism according to claim 3.

5. A shaft sealing mechanism comprising:
   a leaf seal in an annular gap between a rotor and a stator, said leaf seal including stacked sheets separated from one another by a minute gap in a circumferential direction of the rotor, said sheets dividing the annular gap into a high pressure side region and a low pressure side region by virtue of outer peripheral side end parts of said sheets being fixed on a stator side of said annular gap and inner peripheral side end parts of said sheets being unattached at a surface of the rotor, whereby fluid can be prevented from flowing in an axial direction of the rotor through the annular gap; and a high pressure side plate on the high pressure side region of said sheets, and a low pressure side plate on the low pressure side region of said sheets, with an inner peripheral side end of said high pressure side plate being positioned nearer the rotor than is an inner peripheral side end of said low pressure side plate, and with a space being provided between said inner peripheral side end of said low pressure side plate and a surface of the rotor, said space communicating with the annular gap, wherein each sheet includes only one bump protruding from said sheet, said bump protruding from a surface of said sheet only at an inner peripheral side end portion of said sheet such that, in a state in which said sheets are under gas pressure, said bump of each of said sheets makes contact with an inner peripheral side end portion of an immediately adjacent one of said sheets.

6. Fluid machinery including a shaft sealing mechanism according to claim 5.

7. A shaft sealing mechanism according to claim 5, wherein said bump of each sheet is positioned at an end part of the inner peripheral side end portion of said sheet.

8. A shaft sealing mechanism according to claim 7, wherein a gap is provided between each of said sheets and said immediately adjacent one of said sheets.

9. A shaft sealing mechanism according to claim 5, wherein said bump is one hemispherical bump, and wherein said hemispherical bump is arranged such that, in the state in which said sheets are under gas pressure, one part of a surface of said hemispherical bump makes contact with one part of said inner peripheral side end portion of said immediately adjacent one of said sheets.

* * * * *